United States Patent [19]

Suzuki et al.

[11] Patent Number: 5,672,826
[45] Date of Patent: Sep. 30, 1997

[54] SEMICONDUCTOR PRESSURE SENSOR

[75] Inventors: Hideo Suzuki, Hitachinaka; Ken Takahashi, Tokai-mura; Yukio Takahashi, Hitachinaka; Yoshimi Yamamoto, Naka-gun; Kenichi Aoki; Tomoyuki Tobita, both of Hitachinaka, all of Japan

[73] Assignee: Hitachi, Ltd., Tokyo, Japan

[21] Appl. No.: 648,747

[22] Filed: May 16, 1996

[30] Foreign Application Priority Data

May 30, 1995 [JP] Japan ................... 7-131236

[51] Int. Cl.[6] ........................... G01L 9/04
[52] U.S. Cl. .................. 73/754; 73/721; 73/727
[58] Field of Search .................. 73/708, 721, 720, 73/726, 727, 754; 338/4, 42

[56] References Cited

U.S. PATENT DOCUMENTS

| | | | |
|---|---|---|---|
| 4,303,903 | 12/1981 | Matsuoka et al. | 338/4 |
| 4,499,774 | 2/1985 | Tsuchiya et al. | 73/727 |
| 4,712,082 | 12/1987 | Ito et al. | 338/4 |
| 4,771,639 | 9/1988 | Saigusa et al. | 73/721 |
| 4,898,035 | 2/1990 | Yajima et al. | 73/727 |
| 5,186,055 | 2/1993 | Kovacich et al. | 73/727 |
| 5,259,248 | 11/1993 | Ugai et al. | 73/721 |
| 5,454,270 | 10/1995 | Brown et al. | 73/720 |
| 5,554,809 | 9/1996 | Tobita et al. | 73/700 |

*Primary Examiner*—Richard Chilcot
*Assistant Examiner*—Paul D. Amrozowicz
*Attorney, Agent, or Firm*—Kenyon & Kenyon

[57] ABSTRACT

The present invention provides a semiconductor pressure sensor having a glass base and a metal base bonded together satisfactorily so that a silicon diaphragm may not be affected by residual strain, and an intelligent differential pressure and pressure transmitting device employing the semiconductor pressure sensor.

The semiconductor pressure sensor comprises a silicon diaphragm (1) provided with a strain-sensitive element, a glass or ceramic base (2) bonded to the silicon diaphragm (1), and a metal base (4) bonded to the glass or ceramic base (2) with a bonding glass (3). The thermal expansion coefficient of the metal base (4) at a temperature corresponding to the strain point of the bonding glass (3) is not greater than that of the glass or ceramic base (2).

4 Claims, 5 Drawing Sheets

SEMICONDUCTOR PRESSURE SENSOR

BACKGROUND OF THE INVENTION

The present invention relates to a semiconductor pressure sensor and, more particularly, to a semiconductor pressure sensor having a glass or ceramic base and a metal base bonded together with a bonding glass.

A semiconductor pressure sensor to be employed in an intelligent differerential pressure and pressure transmitting device or the like converts a change in the pressure of a gas, a liquid or the like into a corresponding electric signal by a silicon diaphragm provided with a strain-sensitive element. A post member for a semiconductor pressure converter and a method of manufacturing the post member are disclosed in Japanese Patent Laid-Open No. 57-23830 (1982). The semiconductor pressure sensor mentioned in Japanese Patent Laid-Open No. 57-23830 comprises a silicon diaphragm, a glass base and a post member. These members are bonded directly together by an anodic bonding method without using any bond. The post member is made of an Fe-Ni-Co alloy of an austenitic structure processed by cold working at a working ratio to the range of 30 to 90% that does not form a strain-induced martensitic structure, and annealed for stress relieving at a temperature to the range of 200° to 600° C.

The semiconductor pressure sensor disclosed in Japanese Patent Laid-Open No. 55-122125 (1980) has a four-layer structure consisting of a silicon diaphragm, a first glass base, a second glass base and a metal base which are bonded directly together by an anodic bonding method without using any bond. The composition of the material of the metal base is not specified and it is stated simply that the metal base is formed of covar.

A differential pressure sensor and a composite-function type differential pressure sensor are disclosed in Japanese Patent Laid-Open No. 4-320938 (1992). Each of these prior art sensors comprises a semiconductor chip, a fixed base and a housing. The semiconductor chip and the fixed base are bonded together with an oxide solder such as a glass having a low melting point, an Au thin film solder or an Au-Si alloy solder when the fixed base is made of a ceramic material, with an oxide solder when the fixed base is made of an Fe-Ni alloy, or bonded together directly by an anodic bonding method without using any bond when the fixed base is made of borosilicate glass. This prior are semiconductor pressure sensor is constructed, for example, such that a silicon diaphragm is bonded to a glass base by anodic bonding and the glass base is bonded to a metal base with a bonding glass to form a sensing unit. The glass base is made of a glass having a thermal expansion coefficient approximately equal to that of the silicon diaphragm, such as Pyrex, and the metal base is made of an Fe-40 wt % Ni alloy having a small thermal expansion coefficient.

Borosilicate glass with a filler having a low melting point, a small thermal expansion coefficient, a strain point of 310° C. and a bonding temperature of 440° C. is used as the bonding glass. Conditions for bonding together the glass base and the metal base are determined to reduce the effect of residual strain on the silicon diaphragm to the least possible extent, and the glass base and the metal base are kept for bonding, with oxidation and bonding taken into account, in an Ar-10% O2 atmosphere at a bonding temperature of 410° C. for 20 min.

A semiconductor pressure sensor comprises a silicon diaphragm, a glass base and a metal base, the glass base and the metal base are bonded together with a bonding glass 3 to form a sensing unit.

Generally, a PbO glass is used as a bonding glass that must have a small thermal expansion coefficient and a low softening point. The PbO glass containing a filler having a small thermal expansion coefficient as an additive is used as the bonding glass to reduce the thermal expansion coefficient of the PbO glass because a pure PbO glass has a relatively large thermal expansion coefficient.

Although the filler content must be relatively large to obtain a bonding glass having a small thermal expansion coefficient substantially equal to that of the glass base of the semiconductor pressure sensor, minute cracks develop in the bonding glass due to the difference in thermal expansion coefficient between the mother glass and the filler if the filler content is large. Consequently problems including leakage arise in the bonding glass serving also as a sealing material and hence such a bonding glass cannot be employed. Therefore, reduction in thermal expansion coefficient is limited, a bonding glass having a thermal expansion coefficient equal to that of the glass base is unavailable and the thermal expansion coefficient of the bonding glass is greater than that of the glass base. Accordingly, the silicon diaphragm is strained significantly.

The glass base and the metal base are heated at a bonding temperature higher than the strain point of the glass for glass bonding. The strain point is a temperature at which the viscosity of the glass is $4 \times 10^{14}$ P (log $\eta=14.5$). Glass solidifies completely and viscous flow does not occur practically at its strain point.

A strain point is measured by a beam-bending method. The beam-bending method supports a bar-shaped specimen in a horizontal position at two points, the specimen is heated while a load is applied at its middle point and viscosity from the bending rate of the specimen is obtained.

In a cooling process after the glass base and the metal base have been bonded together, stress due to the difference in thermal expansion between the glass base, the metal base and the bonding glass is relaxed by the viscous flow of the glass at temperatures above the strain point. The stress due to the difference in thermal expansion is not relaxed at temperatures below the strain point. The glass base breaks, the glass base separates from the bonding glass or the metal base separates from the bonding glass if the stress is large to reduce bonding strength and airtightness cannot be secured. Therefore, the members to be bonded together must have similar thermal expansion characteristics.

Figure 2:
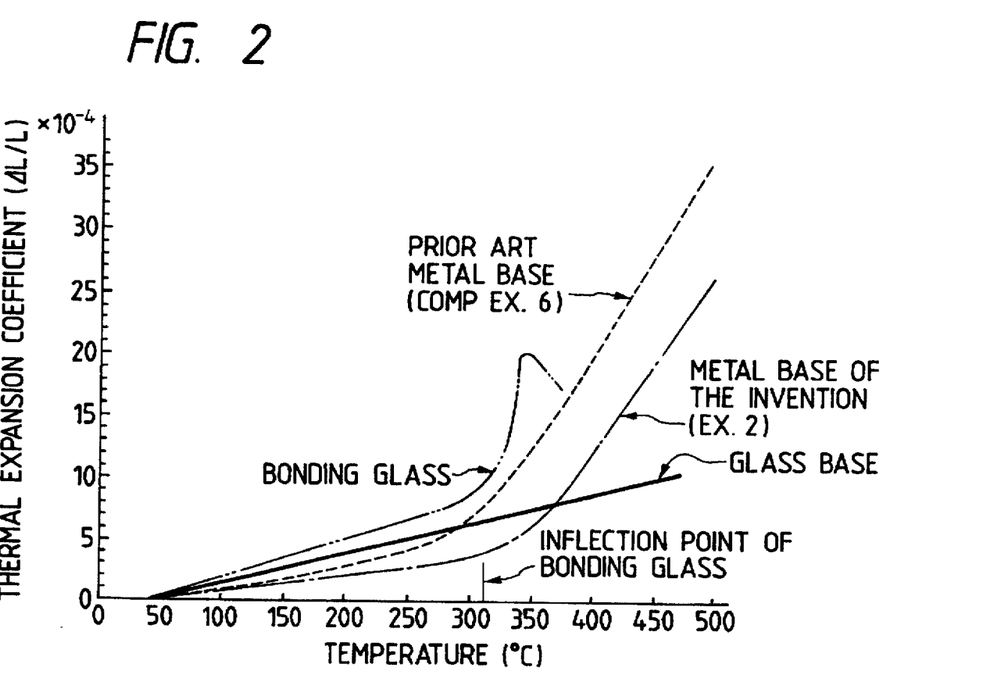
FIG. 2 is a graph comparatively showing the respective characteristics of thermal expansion coefficients of a metal base, by way of example, employed in a semiconductor pressure sensor in accordance with the present invention, with a metal base, a glass base and a bonding glass employed in a prior art semiconductor pressure sensor.

The pressure sensor of the foregoing construction must meet requirements that the joints of the members are airtight, the bonds between the members have high bonding strength and the residual strain after bonding is small to meet functional requirements. As is obvious from FIG. 2 showing thermal expansion characteristics of a glass base, a metal base and a bonding glass with thermal expansion characteristics of a metal base included in a semiconductor pressure sensor in accordance with the present invention, which will be described later, the thermal expansion coefficient of the metal base of an Fe-40% Ni alloy, which is employed in the prior art disclosed in Japanese Patent Laid-Open No. 4-320938, is smaller than that of the glass base and increases linearly with temperature in a temperature range below about 250° C., increases sharply with temperature in a temperature range beyond about 280° C., and is greater than that of the glass base at the strain point (310° C.) of the bonding glass below which the bonding glass solidifies completely. Therefore, a tensile stress is induced in the glass base by the difference in thermal expansion between the members. Consequently, the silicon diaphragm is strained greatly, the pressure sensor is unable to secure appropriate characteristics, the residual strain induces a tensile stress in the glass base, the tensile stress may possibly cause the glass base to break, and the metal base could not have been employed with high reliability as the metal base of a precision semiconductor pressure sensor.

The thermal expansion of the post member made of an Fe-Ni-Co alloy of an austenitic structure employed in the semiconductor pressure converter disclosed in Japanese Patent Laid-Open No. 57-23830 is greater than that of the glass base. When the working ratio of the cold working is increased, the thermal expansion coefficient increases, the inflection point specific to the Fe-Ni-Co alloy shifts toward the lower side, and the post member separates from the glass base. Therefore, the Fe-Ni-Co alloy could not have been used for forming the metal base of a semiconductor pressure sensor of a glass-bonded construction.

The Fe-29Ni-17Co alloy, one of covars, used for forming the metal base of the semiconductor pressure sensor disclosed in Japanese Patent Laid-Open No. 55-122125 has a large thermal expansion coefficient, and the glass base bonded to the metal base may break. Therefore, the alloy could not have been used for forming the metal base.

SUMMARY OF THE INVENTION

The present invention has been made in view of those circumstances and it is therefore an object of the present invention to provide a semiconductor pressure sensor having a glass or ceramic base and a metal base bonded together satisfactorily so that a silicon diaphragm may not be affected by residual strain, and an intelligent differential pressure and pressure transmitting device employing the semiconductor pressure sensor.

The present invention has been made on the basis of new knowledge that the thermal expansion coefficient of a metal base included in a semiconductor pressure sensor at temperatures not higher than the strain point of a bonding glass must be not greater than that of a glass or ceramic base, to eliminate the effect of residual stress that strains a silicon diaphragm induced by the difference in thermal expansion between the bonded components.

Experiments were conducted to form a metal base meeting the foregoing conditions, in which the thermal expansion characteristics of various Fe-Ni-Co alloys were measured and metal bases of different Fe-Ni-Co alloys were bonded to glass bases with a bonding glass. It was found through the experiments that the object of the invention can be achieved when the metal base is made of a material containing 28.0 to 31.0 wt % Ni, 12.0 to 14.0 wt % Co and the balance of Fe, and is formed by cold working at a working ratio of 5 to 40% so that a strain-induced martensitic structure is formed or by annealing for stress relaxation, and the material has a thermal expansion coefficient not greater than that of the glass base and an inflection point of thermal expansion characteristics higher than that of the bonding glass. The thermal expansion coefficient can be optionally determined by determining a combination of the working ratio for cold working, the stress relaxation, and the temperature for annealing. Practically, the composition of the material may have a C content of 0.1% by weight or below, an Si content of 0.3% by weight or below and an Mn content of 0.5% by weight or below, and the material may contain inevitable impurities. A material having an Ni content below 28.0% by weight, a Co content below 12.0% by weight and the sum of the Ni and Co content below 41% by weight, was liable to form martensite during cooling in the perfect annealing process, the thermal expansion coefficient of the material was large accordingly, the inflection point of the thermal expansion characteristics was shifted toward a lower temperature and was unsuitable for forming the metal base. A material having an Ni content above 31.0% by weight and a Co content above 14% by weight has an excessively large thermal expansion coefficient not equal to the thermal expansion coefficient of the glass base.

Figure 3:
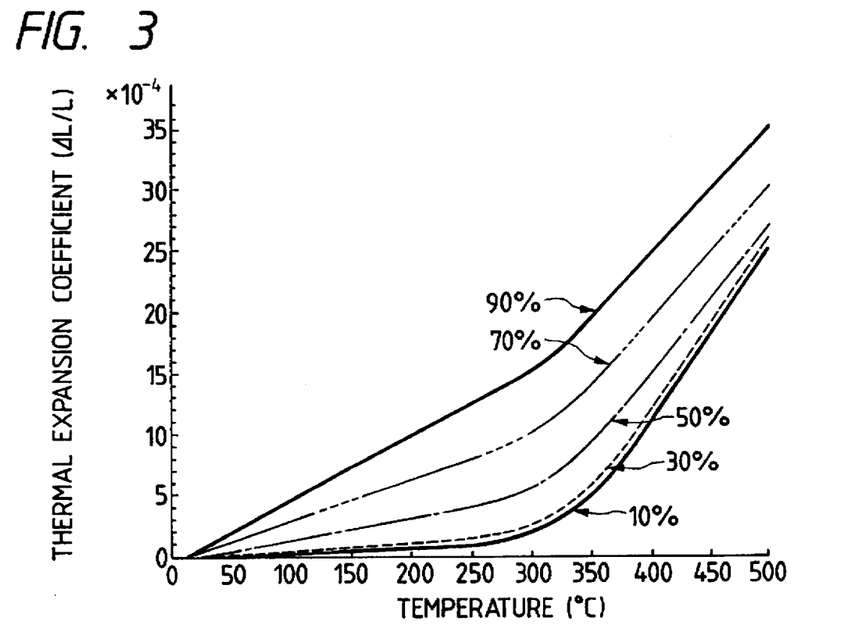
FIG. 3 is a graph showing, by way of example, the dependence of the thermal expansion coefficient of a metal base employed in a semiconductor pressure sensor in accordance with the present invention on temperature for working ratio as parameter.

FIG. 3 shows the variation of the respective thermal expansion coefficients of metal bases made of an Fe-29.4 wt % Ni-13.1 wt % Co alloy for a semiconductor pressure sensor in accordance with the present invention (second embodiment) with temperature for different working ratios. As is obvious from FIG. 3, the thermal expansion coefficient is very large when the working ratio of cold working (rolling, drawing, extruding or swaging) is 50% or above, and the alloy having such an increased thermal expansion coefficient is not suitable for forming the metal base. It is preferable to process a workpiece for forming the metal base by cold working at a working ratio in the range of 10 to 30% that causes some strain-induced martensitic transformation. It is preferable to heat the material in an annealing process subsequent to the cold working process at a temperature of or below the recrystallization temperature of the material and effective in completely relieving stress induced by working, such as a temperature of 700° C. of below.

A typical example of the thermal expansion characteristic of the metal base of the semiconductor pressure sensor (second embodiment) in accordance with the present invention is shown in FIG. 2. Shown also in FIG. 2 is the characteristic of a member of the semiconductor pressure sensor mentioned previously. As mentioned above, the metal base of the prior art semiconductor pressure sensor is made of a material having a thermal expansion coefficient smaller than that of the glass base, linearly varying with temperature in a temperature range below about 250° C., having an inflection point at 285° C., sharply increasing with temperature in a temperature range beyond 285° C. corresponding to the inflection point and greater than that of the glass base at a temperature where the glass having a low melting point solidifies completely (strain point).

The metal base of the semiconductor pressure sensor in accordance with the present invention is made of a material having a thermal expansion coefficient smaller than that of the prior art metal base, increasing with temperature in a temperature range below 345° C. corresponding to the inflection point, and moderately increasing with temperature and substantially equal to the thermal expansion coefficient of the glass base in a temperature range below about 370° C. Therefore, bonding glasses having strain points in a wide temperature range up to a high temperature of 370° C. can be selectively used for bonding together the glass base and the metal base and an appropriate bonding glass can be used for bonding, so that the glass base and the metal base can be firmly bonded together for highly reliable bonding.

Figure 4:
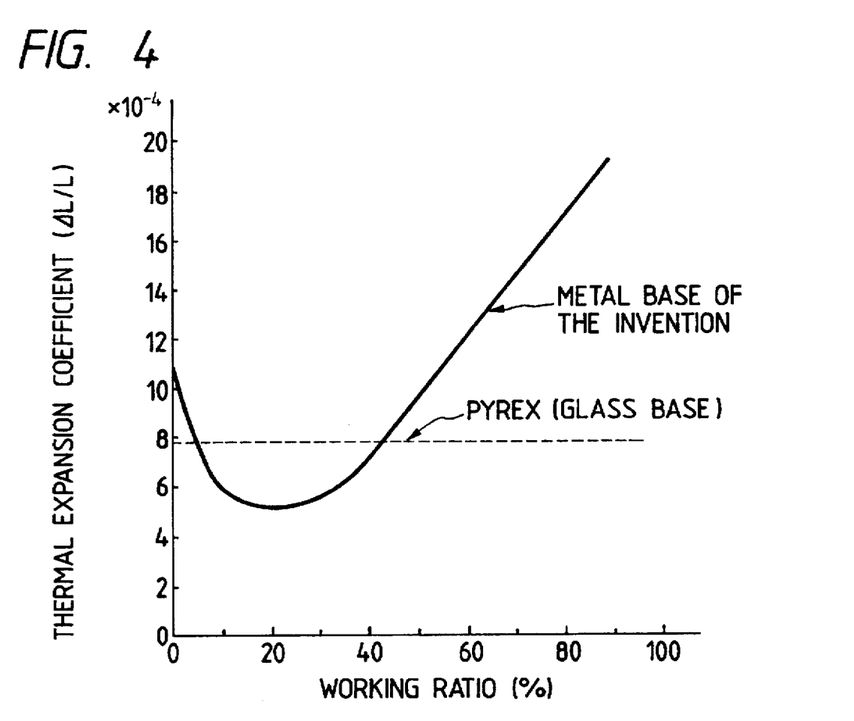
FIG. 4 is a graph showing, by way of example, the dependence of the thermal expansion coefficient of a metal base employed in a semiconductor pressure sensor in accordance with the present invention on working ratio.

FIG. 4 shows the measured relation between the thermal expansion coefficient of an Fe-29.4 wt % Ni-13.1 wt % Co (second embodiment) and working ratios at 350° C. In FIG. 4, a broken line indicates the thermal expansion coefficient of the glass base of Pyrex at 350° C. The thermal expansion coefficient of the metal base of the semiconductor pressure sensor must be not greater than that of the glass base (Pyrex). Therefore, as is obvious from FIG. 4, a desirable working ratio at which the metal base of the semiconductor pressure sensor of the present invention is worked is in the range of 5 to 40%.

The glass base of the present invention may be substituted by a base made of a ceramic material, such as silicon, having a large modulus of elasticity and a small thermal expansion coefficient to reduce the effect of strain on the silicon diaphragm after glass bonding to the least extent. It was proved that the metal base of the present invention is suitable for use in combination with such a ceramic base.

According to the present invention, the residual strain after glass bonding can be removed, and a semiconductor pressure sensor with high accuracy and high reliability, as compared with those of the prior art semiconductor pressure sensors, having high airtightness and sufficient bonding strength can be produced at a high yield rate. An intelligent differential pressure and pressure transmitting device employing the semiconductor pressure sensor of the present invention is able to operate with high reliability for an extended period of time.

DESCRIPTION OF THE PREFERRED EMBODIMENTS

Preferred embodiments of the present invention will be described hereinafter. Table 1 shows the compositions and thermal expansion characteristics of metal bases employed in semiconductor pressure sensors of the present invention (Examples 1 to 8) and those employed in Comparative examples 1 to 6.

TABLE 1

Compositions and Thermal Expansion Characteristics of Metal bases

| | | Content (wt %) | | | | Mean thermal expansion coefficient in the temperature range of 30 to 310° C. ($\times 10^{-4}$) | Temperature corresponding to inflection point (°C.) |
|---|---|---|---|---|---|---|---|
| | | Fe | Ni | Co | Ni + Co | | |
| Examples | 1 | Balance | 28.5 | 13.1 | 41.6 | 6.86 | 318 |
| | 2 | Balance | 29.4 | 13.1 | 42.5 | 5.46 | 345 |
| | 3 | Balance | 30.5 | 13.1 | 43.6 | 7.19 | 372 |
| | 4 | Balance | 29.5 | 12.0 | 41.5 | 4.42 | 314 |
| | 5 | Balance | 29.5 | 14.0 | 43.5 | 6.80 | 376 |
| | 6 | Balance | 30.5 | 12.0 | 42.5 | 6.16 | 347 |
| | 7 | Balance | 31.0 | 13.0 | 44.0 | 6.74 | 369 |
| | 8 | Balance | 30.0 | 14.0 | 44.0 | 7.14 | 380 |
| Comparative examples | 1 | Balance | 29.0 | 17.0 | 46.0 | 10.24 | 310 |
| | 2 | Balance | 29.4 | 15.6 | 45.0 | 7.86 | 293 |
| | 3 | Balance | 27.0 | 13.1 | 40.1 | 10.61 | 295 |
| | 4 | Balance | 32.0 | 13.1 | 45.1 | 12.51 | 401 |
| | 5 | Balance | 29.5 | 11.0 | 40.5 | 10.02 | 270 |
| | 6 | Balance | 40.0 | — | — | 8.48 | 285 |

Alloy ingots each of 5 kg in weight respectively having alloy compositions for Examples 1 to 8 and Comparative examples 1 to 5 shown in Table 1 were produced by melting Fe, Ni and Co in a high-frequency vacuum furnace. The alloy ingots were annealed at 1000° C. for 30 min after hot forging, the forged alloys were subjected to cold drawing at a working ratio of 10% to obtain 4.5 mm diameter wires, and then the wires were annealed at 600° C. for 30 min. Thermal expansion coefficients of the wires were measured in the temperature range of 30° to 500° C. Mean thermal expansion coefficients in the temperature range of 30° to 310° C., which is equal to the strain point of 310° C. of a bonding glass, and temperatures corresponding to inflection points on thermal expansion characteristic curves are shown in Table 1.

An alloy ingot of 5 kg in weight having an alloy compositions for Comparative example 6 shown in Table 1 was produced by melting Fe and Ni in a high-frequency vacuum furnace. The alloy ingot was annealed at 900° C. for 30 min after hot forging, the forged alloy was subjected to cold drawing at a working ratio of 60%, and then the cold drawn alloy was annealed at 430° C. for 30 min. A metal base thus formed is equivalent to the prior art metal base. Measure data representing the thermal expansion characteristic of the metal base in the temperature range of 30° to 310° C. is shown in Table 1.

As is obvious from Table 1, the thermal expansion coefficients of the metal bases in Examples 1 to 8 are equal to or smaller than the thermal expansion coefficient of $7.61 \times 10^{-4}$ of a glass base employed in the semiconductor pressure sensors, and temperatures corresponding to the inflection points are higher than the strain point of 310° C. of the bonding glass.

The thermal expansion coefficients of the metal bases in Comparative examples 2 to 5 are greater than that of the glass base. It is known from Table 1 that the thermal expansion coefficients of metal bases of alloys having a composition having an Ni content outside the range of 28.0 to 31.0% by weight and a Co content outside the range of 12.0 to 14.0% by weight are relatively large.

The alloy forming the Comparative example 1 is a covar having a composition of Fe-29Ni-17Co. The thermal expansion coefficient of the metal base in Comparative example 1 was greater than that of the glass base.

Semiconductor pressure sensors respectively employing the metal bases in Examples 1 to 8 and Comparative examples 1 to 6 were fabricated and the characteristics of the same were evaluated. The glass bases combined with the metal bases in Comparative examples broke and were unsatisfactorily bonded to the metal bases. The characteristics of the metal bases in Comparative examples were unsatisfactory due to residual strain and were found to be unsuitable for use on pressure sensors.

The glass bases combined with the metal bases in Examples 1 to 8 did not break. The airtightness tests of the bonds between the metal bases and the corresponding glass bases proved that the bonds are perfectly airtight and leakage through the bonds were 1010 atm·cc/s or below (Helium leakage). Since the metal bases had no residual strain that affects adversely the silicon diaphragm after bonding, precision semiconductor pressure sensors were obtained.

The bonding glass used for bonding the metal bases in Examples to the glass bases was prepared by adding a filler of PbTiO3 for reducing thermal expansion to a PbO-B2O3-SiO2 glass (LS-1003, Nippon Electric Glass Co., Ltd.) having a small thermal expansion coefficient and a low melting point.

The glass bases were made of Pyrex having a thermal expansion coefficient approximately equal to that of the silicon diaphragm by machining Pyrex workpieces in 5.7 mm by 5.7 mm by 2.0 mm.

Figure 1:
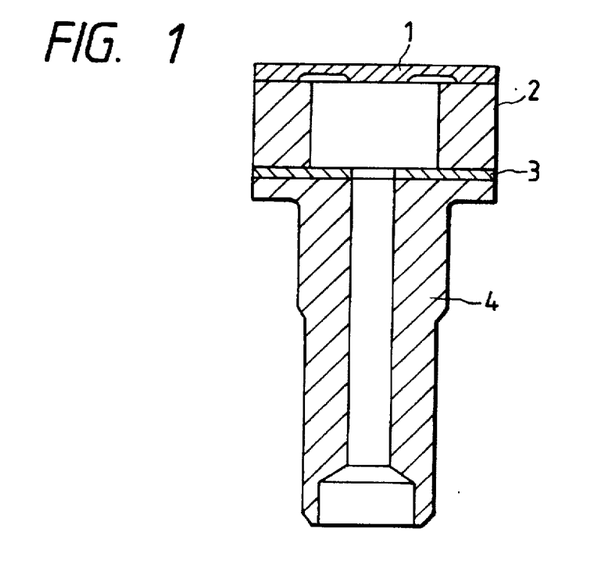
FIG. 1 is a longitudinal sectional view of a semiconductor pressure sensor in accordance with the present invention.

FIG. 1 is a sectional view of a semiconductor pressure sensor embodying the present invention. The semiconductor pressure sensor comprises a silicon diaphragm 1, a glass base 2 and a metal base 4. The glass base 2 and the metal base 4 are bonded together with a bonding glass 3 to construct a sensing unit. The silicon wafer 1 is bonded to the glass base 2 by anodic bonding.

The size of the silicon wafer 1 is 5.7 mm by 5.7 mm by 0.25 to 0.5 mm. The glass base 2 is provided with a hole of 2 to 3.5 mm in diameter. The glass base 2 is bonded to the metal base 4 of an Fe-Ni alloy with the glass bonding layer of 0.1 to 0.2 mm in thickness.

The metal base 4 is a tubular member having an outside diameter of 0.3 to 0.4 mm and an inside diameter of 0.7 to 1.3 mm.

Figure 5:
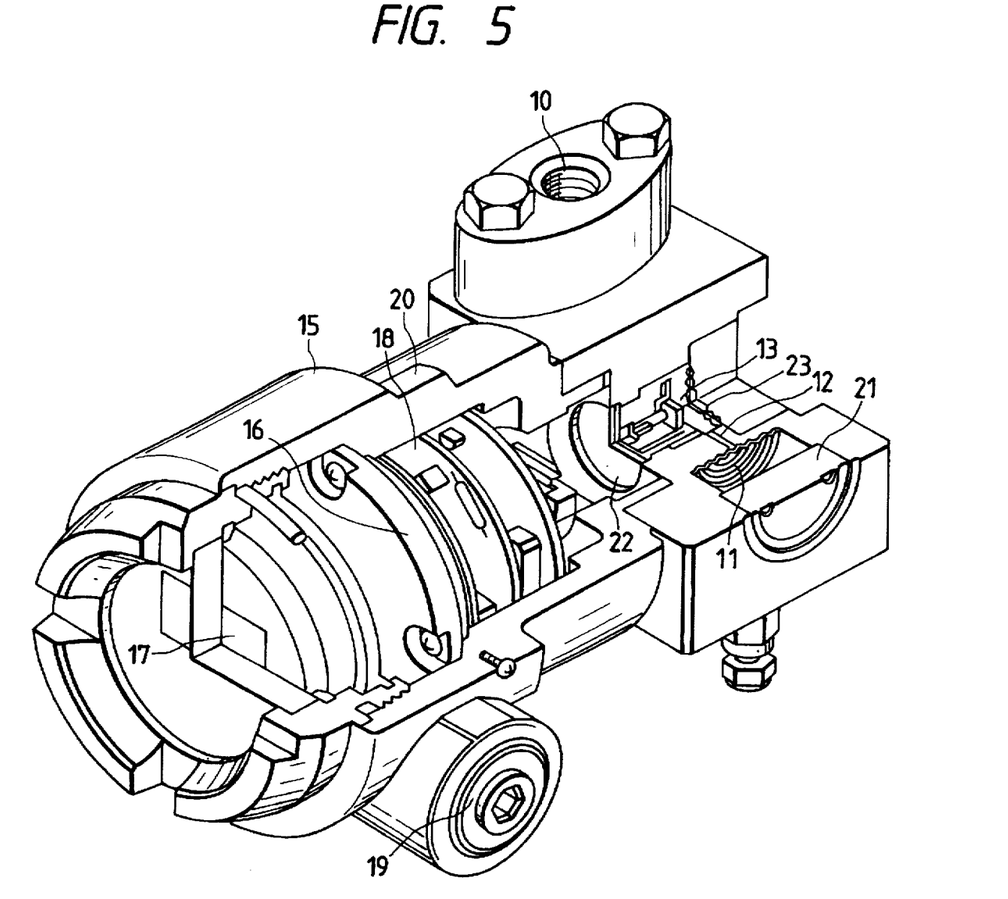
FIG. 5 is a perspective view of an intelligent differential pressure transmitting device employing a semiconductor pressure sensor in accordance with the present invention.
Figure 6:
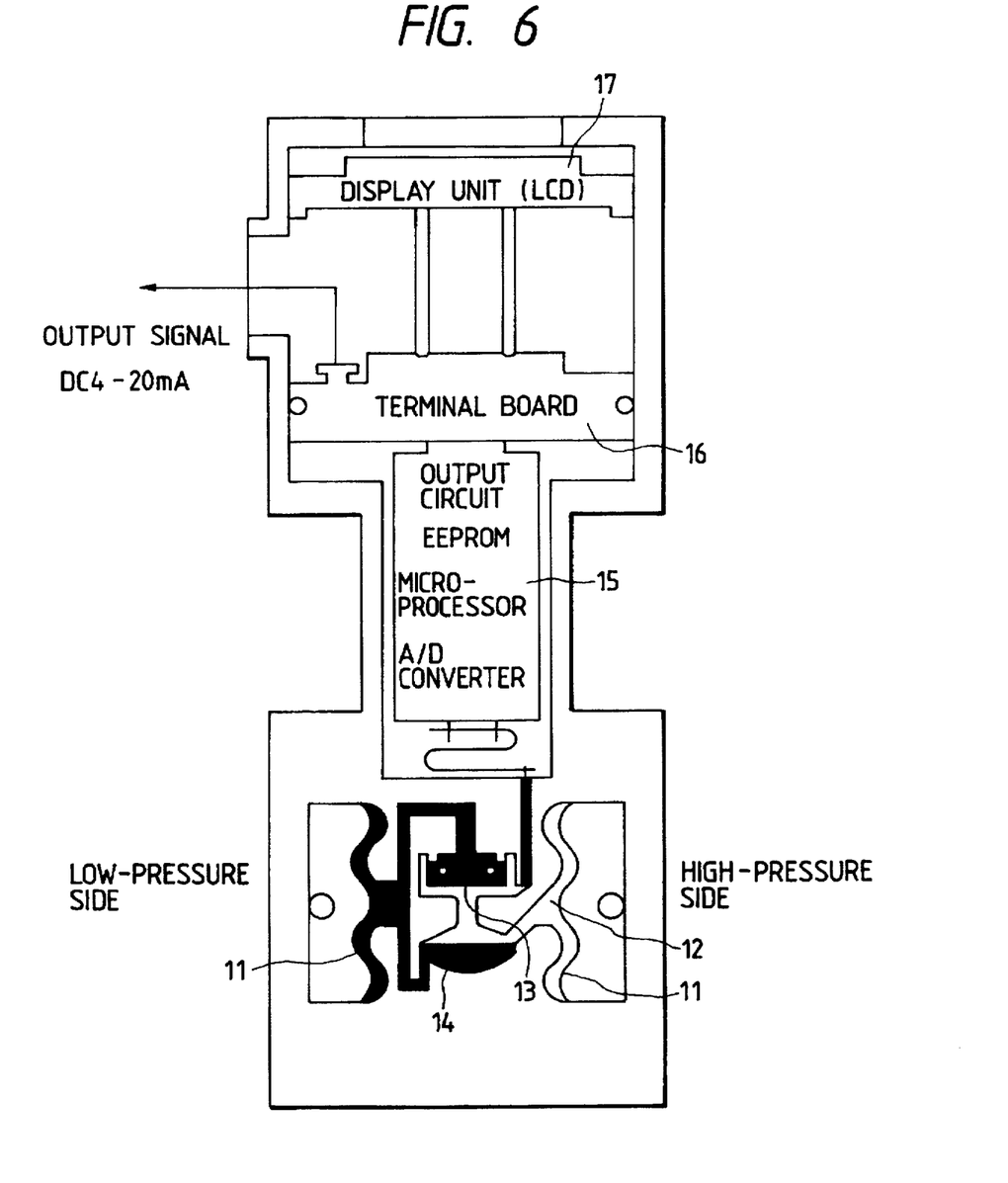
FIG. 6 is a view typically showing the electrical configuration of the intelligent differential pressure transmitting device of FIG. 5.

FIGS. 5 and 6 shows the configuration of an intelligent differential pressure transmitting device employing the semiconductor pressure sensor of the present invention. Referring to FIGS. 5 and 6, the intelligent differential pressure transmitting device comprises sealing diaphragms 11, a pressure sensing unit 9 provided with a center diaphragm 14 and a semiconductor sensor 13, a signal processing unit 15, a terminal board 16 and a display unit 17.

The sealing diaphragms 11 are provided so as to communicate with the high-pressure side and the low-pressure side of a process. The differential pressure between the high-pressure side and the low-pressure side of the process acts through a liquid 12 contained in the sealing diaphragms 11 and the center diaphragm 14 on the pressure receiving part of the semiconductor sensor.

The semiconductor sensor 13 comprises a bridge circuit including a semiconductor diffusion gage that converts a pressure into a corresponding electric resistance by a piezoresistance effect, and an amplifier for amplifying the output signals of the bridge circuit.

The signal processing unit 15 has an A/D converter for converting the output signals of the semiconductor sensor 13 into corresponding digital signals, a microprocessor, a ROM and an output circuit.

The respective pressures of the high-pressure side and the low-pressure side of the process are applied through a differential pressure port 10 to the sealing diaphragms 11, and are transmitted through the liquid 12 and the center diaphragm 14 to the semiconductor sensor 13. Consequently, the resistance of the semiconductor diffusion gage of the semiconductor sensor 13 is changed by a piezoresistance effect. The change in the resistance of the semiconductor diffusion gage is detected by the bridge circuit, and a detection signal provided by the bridge circuit is amplified by the amplifier which in turn outputs an output signal. The signal processing unit 15 processes an electric signal representing the differential pressure between the high-pressure side and the low-pressure side in a digital data processing mode, produces transmission data of a predetermined format, sends out the transmission data on a transmission line not shown, and provides a control signal to display the detected data in a digital mode on the display unit 17. Thus, the detected data for the differential pressure of the process is displayed on the display unit 17.

It was ascertained that this embodiment, as compared with conventional transmitting devices, has an improved accuracy and high reliability.

The intelligent differential pressure transmitting device in this embodiment has the following features.

(1) The intelligent differential pressure transmitting device is provided with a high-performance, high-reliability electronic circuit 18, and employs a high-level ASIC and surface mount devices to improve vibration-proof.

(2) A custom LCD included in the intelligent display unit 17 displays high-accuracy digital data, an analog bar graph and status simultaneously.

(3) A unit 19 enables the application of the intelligent differential pressure transmitting device to an existing process, wiring lines can be connected from the right or the left side, and a soft switch enables H/L switching.

(4) A unit 20 enables external zero adjustment and has a noncontact, high-reliability magnetic mechanism.

(5) A unit 21 has a flangeless construction and a diaphragm made of Hastelloy C having excellent corrosion resistance and having a leakage-proof, highly reliable construction.

(6) A unit 22 has a sensor checking function to detect the abnormal condition of the sensor during measurement.

(7) The intelligent differential pressure transmitting device has a new composite sensor 23 comprising a compact, high-performance etching sensor.

Figure 7:
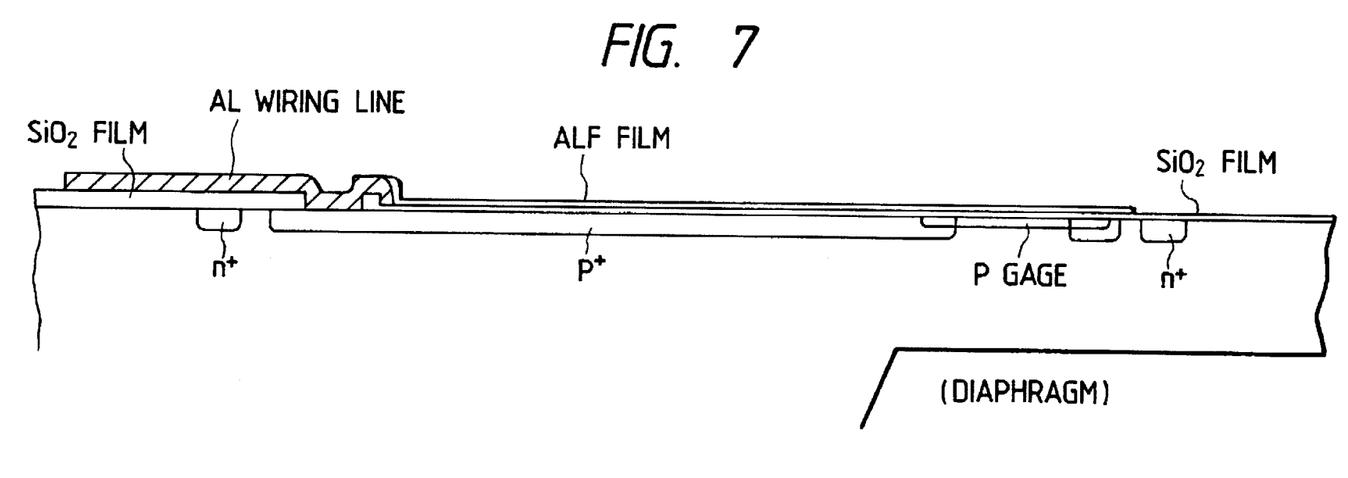
FIG. 7 is a sectional view of a silicon diaphragm included in the semiconductor pressure sensor of FIG. 1.

FIG. 7 is a sectional view of the silicon diaphragm 1. As shown in FIG. 2, a p+ region and n+ regions are formed in a silicon wafer, and SiO2 films, Al wiring lines and an AlF film are formed on the silicon wafer.

What is claimed is:

1. A semiconductor pressure sensor comprising: a silicon diaphragm provided with a strain-sensitive element; a glass or ceramic base bonded to said silicon diaphragm; and a metal base bonded to said glass or ceramic base with a bonding glass, wherein the thermal expansion coefficient of said metal base at the strain point of said bonding glass is not greater than the thermal expansion coefficient of said glass or ceramic base.

2. A semiconductor pressure sensor according to claim 1, wherein said metal base is made of a material containing 28.0 to 31.0% Ni by weight, 12.0 to 14.0% Co by weight and the balance of Fe and having a Ni+Co content of 41% by weight or above, and is formed by processing a workpiece by cold working at a working ratio in the range of 5 to 40% that forms a strain-induced martensitic structure or by annealing for stress relieving a workpiece processed by cold working.

3. An intelligent differential pressure and pressure transmitting device including the semiconductor pressure sensor of claim 1.

4. An intelligent differential pressure and pressure transmitting device including the semiconductor pressure sensor of claim 2.

* * * * *

UNITED STATES PATENT AND TRADEMARK OFFICE
CERTIFICATE OF CORRECTION

PATENT NO. : 5,672,826

DATED : 30 September 1997

INVENTOR(S) : Hideo SUZUKI et al.

It is certified that error appears in the above-identified patent and that said Letters Patent is hereby corrected as shown below:

| Column | Line | |
|---|---|---|
| 1 | 21 | After "ratio" change "to" to --in--. |
| 1 | 23 | After "temperature" change "to" to --in--. |
| 1 | 45 | Change "prior are" to --prior art--. |
| 2 | 25 | Change "Which" to --which--. |

Signed and Sealed this

Thirty-first Day of March, 1998

*Attest:*

BRUCE LEHMAN

*Attesting Officer*   *Commissioner of Patents and Trademarks*